Figure 1:
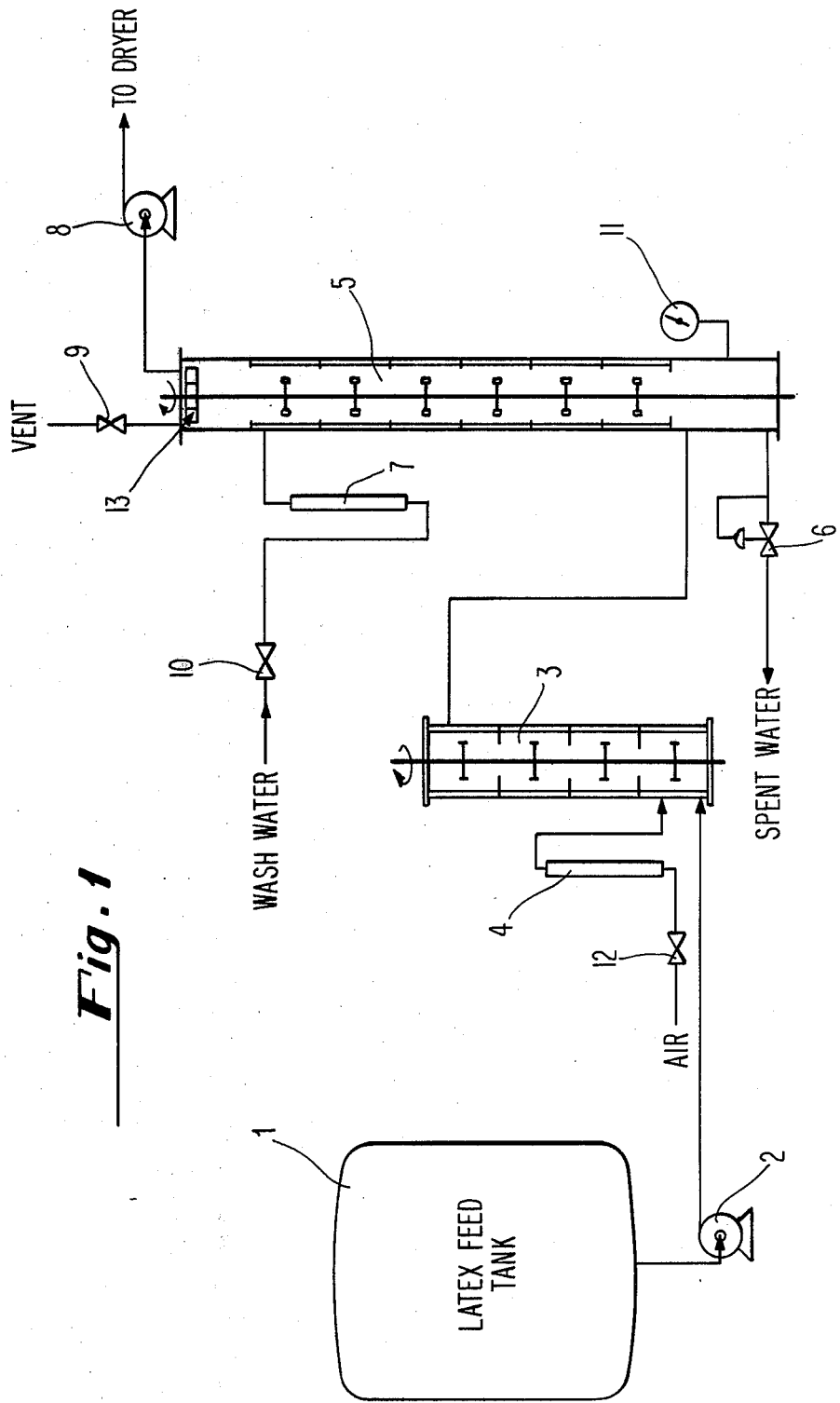

United States Patent [19]

Kydonieus

[11] 4,128,517
[45] Dec. 5, 1978

[54] METHOD OF WASHING POLYMER LATICES BY AERATING

[75] Inventor: Nicholas Kydonieus, Delaware, Pa.

[73] Assignee: Pennwalt Corporation, Philadelphia, Pa.

[21] Appl. No.: 847,627

[22] Filed: Nov. 1, 1977

[51] Int. Cl.$^2$ .............................................. C08L 27/16
[52] U.S. Cl. ..................... 260/29.6 F; 260/29.6 PT; 260/29.7 PT; 528/499
[58] Field of Search .................. 260/29.6 PT, 29.6 F, 260/29.7 PT; 528/499

[56] References Cited

U.S. PATENT DOCUMENTS

| | | | |
|---|---|---|---|
| 2,674,593 | 4/1954 | Condo et al. | 526/88 |
| 3,051,677 | 4/1962 | Rexford | 260/29.1 R |
| 3,068,184 | 12/1962 | Noorduyn et al. | 260/45.75 C |
| 3,193,539 | 7/1965 | Hauptschein | 526/206 |
| 3,219,637 | 11/1965 | Stabler et al. | 260/29.7 R |
| 3,311,601 | 3/1967 | Conley | 260/32.4 |
| 3,513,227 | 5/1970 | DeCoene et al. | 260/887 |
| 3,520,860 | 7/1970 | Bon | 260/29.6 PT |
| 3,663,727 | 5/1972 | Yamamoto et al. | 528/499 |
| 3,752,789 | 8/1973 | Khan | 260/29.6 F |
| 3,780,007 | 12/1973 | Stallings | 526/78 |
| 3,857,827 | 12/1974 | Dohany | 526/208 |
| 4,031,056 | 6/1977 | Patel et al. | 260/29.6 PT |

Primary Examiner—M. J. Welsh

[57] ABSTRACT

Contaminants of an aqueous suspension of polymer particles, e.g., those incurred from aqueous suspension or emulsion polymerization reactions, are removed by aerating said suspension and then washing the resulting foamed suspension by passing it in countercurrent relationship with wash water.

10 Claims, 1 Drawing Figure

METHOD OF WASHING POLYMER LATICES BY AERATING

This invention pertains to process for reducing contaminants in a latex or colloidal polymer suspension by coagulating and aerating a latex or colloidal suspension to facilitate subsequent mass transfer operations with the solids of said latex or colloidal suspension.

It is often desirable to leach a solute from the solids of a slurry or latex such as a surfactant used in emulsion polymerization. Leaching such a finely divided solid, or a solid of approximately the same gravity as the leaching liquid, is hampered by the difficulty of separation of the solid from the leashing liquid. Processes used in the past to remove contaminants from latexes include sedimentation and filtration; these alternate processes have been used in a batchwise fashion requiring long cycle times and excess of leaching liquid. Losses of solid-liquid separation, were also experienced.

Examples of prior art teachings of the washing of polymers prepared in aqueous suspension or emulsion systems include U.S. Pat. Nos. 2,674,593; 3,051,677; 3,068,184; 3,219,637; 3,311,601 and 3,513,227.

It is a principal object of this invention to provide a method of readily and inexpensively reducing contaminants in an aqueous polymer suspension.

The above object and others are accomplished in a method of treating an aqueous polymer suspension, usually obtained by the emulsion or suspension polymerization of ethylenic monomers, wherein said suspension is washed with water to remove contaminants, the improvement comprising aerating said suspension prior to washing to produce a foam wherein the suspended polymer particles have a reduced apparent density, and then washing the foamed suspension by passing it in countercurrent relationship with water. The countercurrent washing is preferably carried out by passing the foamed suspension upward through a column of wash water.

Aeration of the solid, according to the teachings of this invention, dramatically decreases its apparent density and facilitates solid separation. The aerated slurry produced can be handled easily in a continuous fashion through suitable multistage phase contactor equipment with concomitant savings in manpower, leaching liquid requirements, equipment volume, floor space, product quality and yield through less manual handling of the product.

This invention is useful for most aqueous polymer suspensions or latexes from which one may wish to remove contaminants. Examples of ethylenic polymers which are prepared in aqueous suspensions or emulsion systems include polymers and copolymers of vinyl chloride, vinyl flouride, vinyl acetate, styrene, alkyl acrylates, alkyl methacrylates, acrylonitrile, vinylidene chloride, vinylidene flouride, ethylene, propylene, tetrafluoroethylene, isoprene, chloroprene, butadiene and the like. The aqueous latex preparations may be of harder resin particles or softer rubbery (elastomer) particles. Of particular interest are the vinylidene fluoride polymer latexes of resins and elastomers prepared as disclosed in such prior patents as U.S Pat. Nos. 3,051,677; 3,193,539; 3,780,007; 3,857,827 and the like.

Coagulating aids, for example soduim chloride and other salts, mineral acids, lower alkanols and the like, may be used to help coagulate the polymer prior to or during aeration.

The wash water is preferable pure deionized water although the incorporation of cleaning or washing aids to the wash water may be practiced.

In the accompanying drawing, a flow diagram of the process of this invention is shown. A latex is place in the latex feed tank 1. Wash water is allowed to enter column 5 through a water flowmeter 7 at a predetermined rate by manipulating valve 10. Vent valve 9 is opened and column 5 allowed to fill with water; then the vent valve is closed. The column pressure will increase until back pressure valve 6 setting is reached, thereafter back pressure valve 6 will maintain column pressure by discharging sufficient water. At this point, latex pump 2 is started in order to introduce latex into the coagulator 3 at a predetermined rate. The latex flow rate can be controlled with the pump speed. At the same time valve 12 is opened sufficiently to allow air to enter the coagulator 3 at a predetermined rate regulated by flowmeter 4. The coagulator agitator is then started to coagulate and aerate the latex. The coagulated and aerated latex fills the coagulator 3 displacing the excess air from the coagulator 3 into the column 5. The excess air in column 5 is vented through vent valve 9. When the coagulated and aerated latex enters column 5 the column agitator is started. The coagulated latex froth ascends in column 5 coming into contact with wash water in a counter-current fashion to rid the polymer particles of water soluble contaminants. The washed polymer reaches the top of column 5, where it forms a cake. Agitator 13 maintains cake integrity. When the washed polymer cake reaches a desired size, discharge pump 8 is started at such a rate as to maintain the polymer cake size. The product of the system discharging through pump 8 may be sent to a dryer, and then to a packaging system.

In the following two examples, the process of this invention is illustrated for two different polymer latices in comparison with the previous used batch processes.

EXAMPLE I

A. Batchwise Washing of a Vinylidene Fluoride Copolymer (Prior Method)

A copolymer of a major proportion of vinylidene fluoride and a minor proportion of a tetrafluoroethylene was discharged from the aqueous reaction system in the form of a latex of about 25% solids containing other reaction ingredients such as surfactant and buffer. To produce a powder of high quality, these ingredients (contaminants) had to be removed from the copolymer, and this was accomplished by washing the latex with deionized water.

In the batchwise system under consideration, 200 lbs. of latex was charged to a 150 gallon tank equipped with a turbine agitator. The agitator diameter to tank diameter ratio was about ⅓. The latex was coagulated by agitating for 1 to 3 hours at an agitator tip speed of 1400 to 1800 fpm. When the latex was coagulated, deionized water was added to the latex in the amount of about two volumes of water per volume of coagulated latex. The mixture was then agitated for one-half hour, the agitator was shut off and the mixture allowed to stand for one hour. The copolymer solids were separated from the water on standing and the water layer decanted. This procedure of deionized water addition, agitation, separation and decantation was repeated until the decanted water conductivity decreases to 3 micro-mho. It was found that as many as 10 washes were required to satistactorily wash the polymer of contaminating ingredients necessitating a water usage of from 50 to 80 lbs. of water per pound of polymer washed. Polymer yield was approximately 90% due to losses incurred in the decantation steps of the process. When washed polymer slurry was allowed to stand for long periods of time it showed an increase in conductivity indicating less than intimate contact between the polymer and the wash water.

B. Continuous Washing of a Vinylidene Fluoride Copolymer (New Process)

In the continuous system of this invention, the latex as described in A was pumped at a steady rate into the bottom of a coagulation-aeration apparatus in which air was introduced at a rate of between 50 to 500% by volume of latex rate. The coagulator, as generally shown at 3 in FIG. 1 of the accompanying drawing was a multistage high-shear machine where the latex and air were sheared into an intimate mixture in a restricted space. It was equipped with high-shear agitators and was capable of imparting shear energy to the processes latex at a minimum rate of 0.05 horsepower per pound (hp./lb.) of solids. The agitation chambers of the machine were baffled to increase the power coupling between the agitators and aerated material. The coagulator, having a diameter of 6 inches and four agitation stages, was capable of handling a 25% vinylidene fluoride copolymer latex at a rate of about 100 lbs./hr. The coagulator product was a stable, thick slurry foam resembling shaving lather. The coagulated and aerated latex was fed to the bottom of a 14 stage, 4 inch continuous counter-current agitated contactor as generally shown at 5 in FIG. 1 where it was washed in a counter-current fashion with deionized water at at rate of about 18 lb./hr. based on dry copolymer. The copolymer slurry discharged from the column was controlled to conductivity of 5 micro-mho and the wash column required a deionized water usage of from 8 to 13 lbs. of water per pound of polymer processed. In addition, the wash column product slurry conductivity did not increase on standing for prolonged periods indicating intimate contact between the polymer and the wash water in the column. The material yield of the continuous system was found to be in excess of 99%. The material hold-up of the system was found to be about 2 lbs. based on dry copolymer.

Example II

A. Batchwise Washing of a Homopolymer of Vinylidene Fluoride (Prior Method)

A venylidene fluoride homopolymer was discharged from the aqueous reaction system in the form of latex of about 18% solids containing a polymerization surfactant. To produce a polymer powder of high quality, the surfactant had to be removed and this was accomplished by washing with deionized water.

In the batchwise system, 200 lbs. of latex was charged to a 150 gallon tank equipped with a turbine agitator. The agitator diameter to tank diameter ratio was ⅓. The latex was coagulated by agitation for 2 to 8 hours at an agitator tip speed of 1400 to 1800 fpm. When the latex was coagulated, deionized water was added in the amount of about five volumes of water per volume of latex. The mixture was then agitated for ½ hour, the agitator was shut off and the mixture allowed to stand for 1 hour. The homopolymer solids separated as a thick slurry floating on top of the water and the water layer was decanted. The procedure of deionized water addition, agitation, separation and decantation was repeated until the decanted water conductivity decreased to 10 micro-mho. It was found that as many as four washes were required to satisfactorily wash the polymer of surfactant, necessitating a water usage of from 50 to 90 lbs. of water per pound of polymer processed. Polymer yields ranged from 80 to 90% due to losses incurred in the decantation steps of the process.

B. Continuous Washing of a Homopolymer of Vinylidene Fluoride (New Process)

The equipment used to wash the homopolymer of A above was the same used to wash the copolymer in Example IB, with the exception of the coagulator. The coagulator was a 6 inch I.D., ten stage unit capable of imparting shear energy to the homopolymer latex at a minimum rate of 0.15 hp./lb. of solids processed.

The latex was pumped to the coagulator at a rate of 100 lbs./hr., where it was coagulated and mixed intimately with air at a rate of between 50 and 500% by volume of the latex rate. The highly aerated polymer slurry was fed to the continuous countercurrent wash column where it was contacted with deionized water at a rate of about 18 lbs./hr. based on dry homopolymer. The homopolymer slurry discharged from the column was controlled to conductivity of 20 micro-mho and this required the usage of 4 to 5 lbs. of deionized water per pound of dry polymer processed. The homopolymer yield of this process was found to be well in excess of 99.5%. The material holdup of the system was found to be about 2.5 lbs. based on dry homopolymer.

What is claimed is:

1. In the method of reducing contaminants in an aqueous polymer suspension wherein said suspension is washed with water to remove contaminants the improvement which comprises aerating said suspension prior to washing to produce a foam wherein the suspended polymer particles have a reduced apparaent density, and then washing the foamed suspension product by passing it in counter-current relationships with wash water.

2. The method of claim 1 wherein said foam is produced by aerating and mechanically agitating said suspension.

3. The method of claim 1 wherein a chemical coagulating agent is added to the suspension.

4. The method of claim 1 wherein the washed product is continuously recovered.

5. The method of claim 1 wherein said polymer suspension comprises vinylidene fluoride polymer or copolymer particles.

6. The method of claim 1 wherein the product is passed in counter-current relationships with wash water by passing the product continuously upward through a column fed with wash water at the top.

7. The method of claim 2 wherein the washed product is continuously recovered.

8. The method of claim 6 wherein said polymer suspension comprises vinylidene fluoride polymer or copolymer particles.

9. The method of claim 8 wherein said foam is produced by aerating and mechanically agitating said suspension.

10. The method of claim 9 wherein the polymer of said polymer suspension consists of vinylidene fluoride homopolymer.

* * * * *